(12) United States Patent
Hayee et al.

(10) Patent No.: US 7,209,671 B1
(45) Date of Patent: Apr. 24, 2007

(54) MULTIPLE DETECTOR DECISION RECEIVER

(75) Inventors: M. Imran Hayee, Columbia, MD (US); Bo Pedersen, Annapolis, MD (US); Alexei N. Pilipetskii, Colts Neck, NJ (US); Gerald E. Lenner, Tinton Falls, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 622 days.

(21) Appl. No.: 10/127,739

(22) Filed: Apr. 22, 2002

(51) Int. Cl.
*H04B 10/06* (2006.01)

(52) U.S. Cl. .................. 398/207; 398/208; 398/212

(58) Field of Classification Search ........ 398/202–214; 385/88
See application file for complete search history.

(56) References Cited

U.S. PATENT DOCUMENTS

| | | | | |
|---|---|---|---|---|
| 4,485,347 A | * | 11/1984 | Hirasawa et al. ........... | 329/303 |
| 5,371,625 A | * | 12/1994 | Wedding et al. ............ | 398/141 |
| 5,805,641 A | * | 9/1998 | Patel ......................... | 375/317 |
| 6,496,547 B1 | * | 12/2002 | Powell et al. ............... | 375/316 |
| 6,615,386 B2 | * | 9/2003 | Yano et al. ................. | 714/780 |
| 2002/0122504 A1 | * | 9/2002 | Payne et al. ................ | 375/317 |
| 2003/0170022 A1 | * | 9/2003 | Josef Moeller ............. | 398/27 |

* cited by examiner

*Primary Examiner*—Dzung Tran
(74) *Attorney, Agent, or Firm*—Grossman, Tucker, Perreault & Pfleger, PLLC (57) ABSTRACT

An optical signal receiver including a plurality of threshold decision circuits configured to receive an electrical signal representative of the optical signal. Each of the threshold decision circuits is configured to sample the electrical signal and to provide an associated threshold decision circuit output in response to a comparison of the signal to an associated threshold level. The threshold decision circuit outputs are coupled to an output decision circuit, which is configured to output a signal representative of a binary state of the optical signal. An optical communication system and a method of reconstructing received data signal in an optical communication system are also provided.

37 Claims, 6 Drawing Sheets

MULTIPLE DETECTOR DECISION RECEIVER

CROSS REFERENCE TO RELATED APPLICATION

The present application is related to commonly assigned application Ser. No. 10/127,741, filed Apr. 22, 2002, the teachings of which are incorporated herein by reference.

FIELD OF THE INVENTION

This invention relates to receivers for communication systems, and, in particular, to a system and method for improving the quality of received signals through use of multiple decisions.

BACKGROUND OF THE INVENTION

Reliable optical communication systems require mechanisms for minimizing the effects of signal degradation occurring between associated transmitters and receivers. Signal degradation occurs due to a variety of factors that cannot be completely eliminated, and is exacerbated by the long transmission distances and high optical channel counts required in many applications. Due to signal degradation, some transmitted data may be incorrectly interpreted at a receiver. If data is misinterpreted at a rate above that which is acceptable, the efficacy and viability of the system may be lost.

A widely used measure of system performance is the system bit error rate (BER). The BER for a system is the ratio of the number of incorrectly received bits to the total number of received bits. For example, in a system having a BER of $10^{-9}$, one bit is misread out of every one billion bits received.

System performance may also be described in terms of the parameter Q. The Q value of a system indicates the signal-to-noise ratio of the electric signal regenerated by the receiver. Generally, when the signal to noise ratio or Q decreases, the bit error rate increases and vice versa. The specific relationship between the system Q value and BER depends on the particulars of the communication system. Typically, however, the BER rate improves exponentially with improvements in Q values above 10 dB.

In an effort to achieve acceptable system BER and Q, various advances in signal receiver configurations have been proposed. Typically, a receiver includes a single threshold decision circuit. The decision threshold circuit may, for example, include a comparator for comparing the received data signal with a predetermined voltage level (the decision threshold) at a predetermined time interval. If the voltage level of the received data signal is above the decision threshold at a particular sample time, the comparator may output a digital one. If, however, the voltage level of the received data signal is below the decision threshold, the comparator may output a digital zero.

The BER for a system including such a receiver is minimized by optimally setting the signal sampling time and threshold level. Unfortunately, however, even moderate amounts of signal distortion can limit the BER achievable by such receivers. These limitations are incompatible with the increase in data rates demanded by the ever-increasing capacity of optical networks.

Accordingly, there is a need for a signal receiver that overcomes the deficiencies of the prior art in providing reliable detection of a received data signal.

SUMMARY OF THE INVENTION

An optical signal receiver consistent with the present invention includes a plurality of threshold decision circuits configured to receive an electrical signal representative of an optical signal. Each of the threshold decision circuits is configured to sample the electrical signal and provide an associated threshold decision circuit output in response to a comparison of the signal to an associated threshold level. The threshold decision circuit outputs are coupled to an output decision circuit, which is configured to output a signal representative of a binary state of the optical signal.

In one embodiment, an optical signal receiver consistent with the invention includes a plurality of threshold decision circuits configured to receive an electrical signal representative of the optical signal. Each of the threshold decision circuits is configured to sample the electrical signal at a different associated sample time and to provide an associated threshold decision circuit output in response to a comparison of the signal to an associated threshold level. The threshold decision circuit outputs are coupled to an output decision circuit, e.g. an OR gate, configured to output a digital one if at least one of the threshold decision circuit outputs is a digital one.

In another embodiment, the output decision circuit is configured to apply a selected logic function based on the associated threshold decision circuit outputs from each of the threshold decision circuits. An optical communication system consistent with the invention includes a transmitter for transmitting an optical signal on an optical information channel and a receiver consistent with the invention for receiving the optical signal.

A method of reconstructing a received data signal in an optical communication system includes: sampling the data signal at sample times; providing a threshold decision output associated with each of said sample times in response to a comparison of said data signal with an associated threshold level; and coupling each said threshold decision output to an output decision circuit configured to output a signal representative of a binary state of the data signal.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
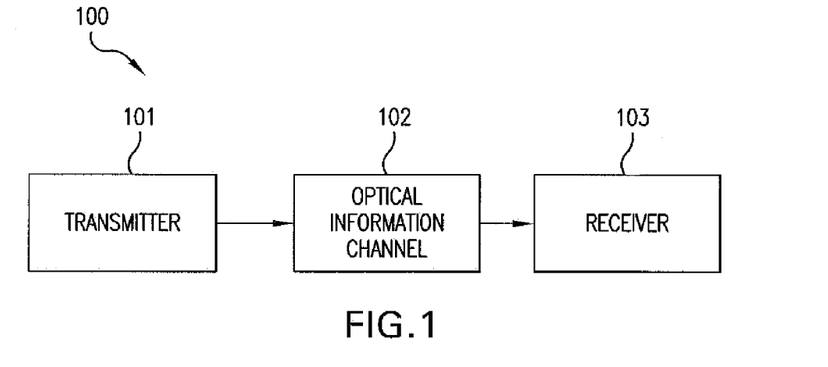
FIG. 1 is a block diagram of an exemplary optical communication system consistent with the present invention.

With reference to FIG. 1, there is illustrated an exemplary optical communication system 100 including a receiver 103 consistent with the present invention. Those skilled in the art will recognize that the system 100 has been depicted as a highly simplified point-to-point system form for ease of explanation. It is to be understood that a receiver consistent with the invention may be incorporated into a wide variety of network components and configurations.

The optical communication system 100 includes a transmitter 101, an optical information channel 102, and a receiver 103. At the transmitter 101, data may be modulated on an optical wavelength for transmission over the optical information channel 102. The optical information channel 102 may include an optical fiber waveguide, optical amplifiers, optical filters, dispersion compensating modules, and other active and passive components. As an optical signal travels across the optical information channel 102, distortions including pulse spreading and timing jitter may be introduced.

Figure 2:
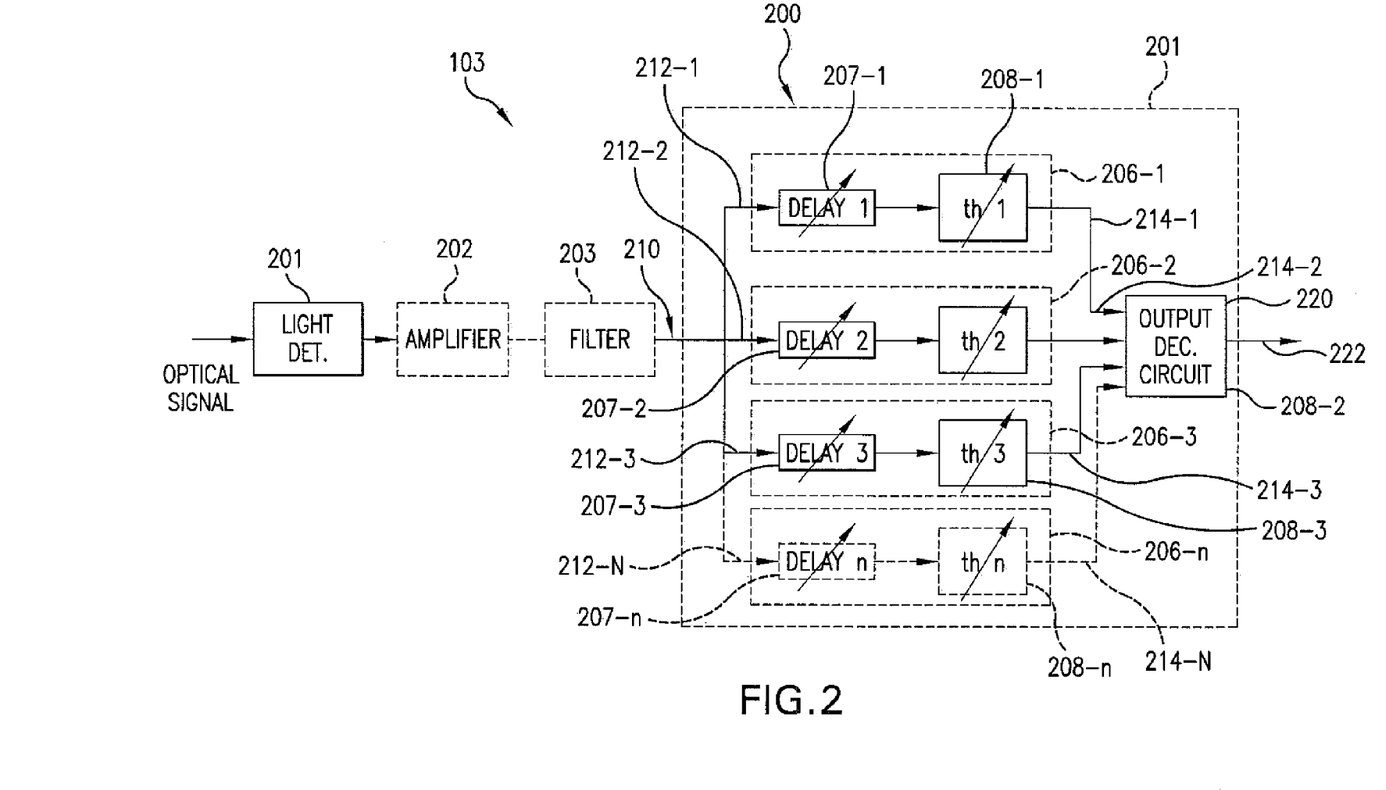
FIG. 2 is a block diagram of an exemplary embodiment of a multiple detector decision receiver consistent with the present invention.

Advantageously, a receiver consistent with the invention minimizes the effects of signal distortion in a received signal by making more than one decision to capture the peaks of various pulses in the presence of, for example, timing jitter. An exemplary embodiment of a receiver 103 consistent with the invention is illustrated in FIG. 2. Although the illustrated receiver includes particular components in a particular configuration, those skilled in the art will recognize that the principles of the present invention may be achieved through use of other components and configurations. It is to be understood, therefore, that the embodiment illustrated herein is provided only by way of explanation, not of limitation.

The exemplary embodiment illustrated in FIG. 2 includes a light detector 201, e.g. a photodiode, which, in a known manner, converts received optical signals into associated electrical signals. The electrical signals may be coupled, e.g. through an amplifier 202 and filter 203, to a multiple time decision circuit 200. The multiple time decision circuit 200 includes a plurality of decision circuits 206-1, 206-2, 206-3 . . . 206-n, each of which are coupled for receiving the electrical signal at an associated input, i.e. 212-1, 212-2, 212-3 . . . 212-n, respectively.

Each decision circuit includes an associated adjustable delay element 207-1, 207-2, 207-3 . . . 207-n, e.g. parallel connected capacitors, for imparting an associated adjustable delay to the electrical signal received at its input, and an associated comparator circuit 208-1, 208-2, 208-3 . . . 208-n. Those skilled in the art will recognize a wide variety of configurations for the delay elements and comparator circuits. Moreover, although the illustrated embodiment includes more than three decision circuits, it is to be understood that a receiver consistent with the invention may include two or more decision circuits, depending on the characteristics of the communication system, without departing from the scope of the present invention.

In general, each decision circuit samples the received signal at a distinct time determined by the delay imparted by an associated delay element, and compares the received signal with an associated threshold level. If the received signal is above the threshold level at the associated sample time, the decision circuit outputs a digital one. If the received signal is below the threshold at the associated sample time, the decision circuit outputs a digital zero.

In the illustrated exemplary embodiment, the output 214-1, 214-2, 214-3 . . . 214-n of each decision circuit 206-1, 206-2, 206-3, . . . 206-n is coupled to an associated input of an output decision circuit 220. In one embodiment, the output decision circuit 220 may function as an OR gate. That is, if any of the inputs to the output decision circuit 220 are at a digital one level, the output of the output decision circuit will be a digital one. Otherwise the output of the output decision circuit 220 is a digital zero. In this manner, the received optical signal is reconstructed as an electrical signal at the output 222 of the output decision circuit 220. Those skilled in the art will recognize that OR-type functionality in the output decision circuit 220 may be achieved by a variety of configurations e.g., by a simple OR gate, cascaded OR gates, or the like.

Figure 3:
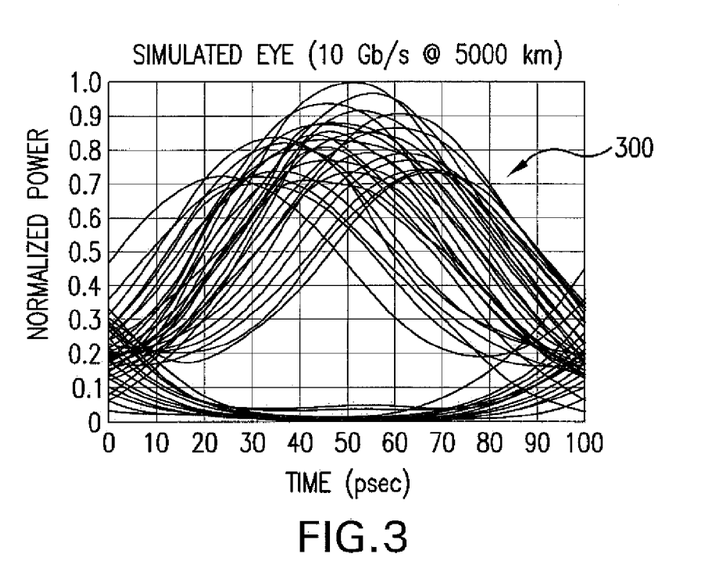
FIG. 3 is an eye diagram illustrating timing jitter in an exemplary data signal received by a receiver consistent with the invention.
Figure 4:
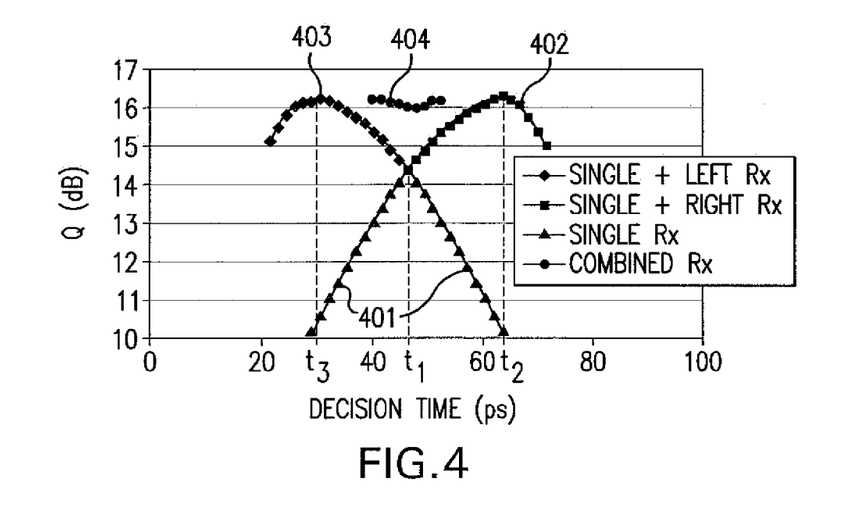
FIG. 4 is a plot of Q value vs. time for various decision circuits in a receiver consistent with the invention, when the receiver receives the data signal illustrated in FIG. 3.

Advantageously, the effects of distortion such as timing jitter in the received signal may be minimized by appropriate selection of the delay times and the threshold levels for the decision circuits. FIGS. 3 and 4 illustrate an exemplary process for setting delay times and threshold levels of the decision circuits, and the associated improvement in receiver performance. In particular, FIG. 3 illustrates an exemplary eye diagram 300 for the middle channel of three channels for a 5000 km link with single mode fiber (SMF) and dispersion slope compensation (DSCF) fibers at a data rate of 10 Gb/s/channel (period T of 100 psec). FIG. 4 illustrates exemplary plots of the Q value vs. decision time associated with a receiver consistent with the invention for receiving the signal illustrated in FIG. 4 and having three decision circuits, circuits 206-1, 206-2, and 206-3.

It is well known that an eye diagram for a data signal may be observed on an oscilloscope by monitoring the data signal voltage on the vertical input of the oscilloscope and triggering on the data clock. The eye diagram is open or closed to an extent determined by signal degradation. An open eye diagram represents less signal degradation. Conversely, a closed eye diagram represents more signal degradation. Those skilled in the art will recognize that the eye diagram 300 of FIG. 3 is associated with a signal exhibiting a relatively large amount of timing jitter.

In an exemplary method of adjusting the delay times and thresholds of the decision circuits, all decision circuits except for the first decision circuit 206-1 may initially be turned off. The delay or sample time $t_1$ for the first delay component 207-1 and the threshold level $th_1$ for the first comparator circuit 208-1 may be set to correspond to a point centered in the eye diagram. Plot 401 in FIG. 4 illustrates the resulting Q value vs. decision time for the first decision circuit 206-1. For the input data signal illustrated in the eye diagram of FIG. 3, and assuming an optical signal to noise ratio of 10 dB in the 50 GHz bandwidth, a maximum obtainable Q value of about 14.38 dB occurs at a first delay time $t_1$ of 47 psec. Thus, assuming the uncertainty of decision timing is about 5 psec, an average maximum obtainable Q value may be about 14 dB with a single time decision receiver employing one decision circuit 206-1.

A second decision circuit 206-2 may be then turned on with the timing of the first decision circuit 206-1 at its delay time $t_1$. The threshold may be set to the same threshold as that for the first decision circuit, and the delay time for the second decision circuit 206-2 may be increased to times greater than $t_1$, until a maximum Q value is obtained. Some of the pulses, i.e. "ones" that would not be decoded correctly by the first decision circuit 206-1, will now be decoded by the second decision circuit 206-2.

Plot 402 in FIG. 4 illustrates the resulting Q value vs. second decision circuit decision time $t_2$ when the first decision circuit 206-1 is used in combination with the second decision circuit 206-1. The resulting Q value in this instance accounts for those pulses that have a higher chance of being decoded correctly at second decision circuit 206-2 than at the first decision circuit 206-1. Such pulses would have a voltage level at the timing of the second decision circuit that is higher than its voltage level at the timing of the first decision circuit. The maximum Q value shown in plot 402 is 16.31 dB and occurs a second delay time $t_2$ of about 64 psec.

Similarly, plot 403 in FIG. 4 illustrates the resulting Q value vs. third decision circuit delay time $t_3$ when the third decision circuit 206-3 is turned on with the first delay time set to time $t_1$. The threshold setting for the third decision circuit may be maintained at the same threshold as the first and second decision circuits. In this instance, the resulting Q value accounts for those pulses that have a higher chance of being decoded correctly at third decision circuit 206-3 than at the first decision circuit 206-1. The maximum Q value shown in plot 403 is 16.23 dB and occurs a third delay time $t_3$ of about 31 psec.

With all three decision circuits turned on, the Q of the first decision circuit may then be recalculated. The delay time for the second decision circuit 206-2 may be maintained at time $t_2$, and the delay time for the third decision circuit 206-3 may be maintained at time $t_3$ With these settings, a maximum Q value of about 16.04 dB occurs at time $t_1$ of about 47 psec.

Plot 404 in FIG. 4 illustrates the resulting combined Q value for the multiple time decision circuit 200 when the second and third decision circuits are maintained at decision times $t_2$ and $t_3$, respectively, and the decision time $t_1$ for the first decision circuit is varied to times greater and less than 47 psec. Assuming a 5 psec window for uncertainty in the delay time $t_1$, the resulting Q value is about 16 dB for the multiple time decision circuit 200 in the example illustrated in FIGS. 3 and 4. The improvement in the Q value using three decision circuits, as opposed to one, is thus about 2 dB in for the illustrated example.

Advantageously, because the outputs of the decision circuits in a receiver consistent with the invention are provided to a separate output decision circuit 220 that in one embodiment may function as an OR gate, a digital one can be decoded correctly by any one of the decision circuits. Pulse signals representative of digital ones that were decoded incorrectly at a first sample or delay time $t_1$ can be decoded correctly at subsequent times, e.g. at a second delay time $t_2$ or a third delay time $t_3$. In addition, as will be understood by those skilled in the art, the threshold level for the first decision circuit in a multiple-time decision circuit can be increased compared to employing only a single decision circuit. Increasing this threshold level will allow more pulses representative of digital zeroes to be decoded correctly.

The improvement in the Q value suggests that the BER of both ones and zeroes should be improved similarly. However, this may not be the case because an output decision circuit 220 utilizing an OR gate functionality will output a digital zero only if all inputs from the multiple decision circuits at various times is a digital zero. Therefore, the multiple time decision circuit 200 may correct "wrong ones" but may incorrect "correct zeroes."

Because zeroes may be uncorrected, the BER should be redefined. The BER for a single-time decision circuit receiver may be described as:

$$BER = \tfrac{1}{2} BER(1) + \tfrac{1}{2} BER(0) = BER(1) = BER(0) \qquad (1)$$

where $BER(1) = \tfrac{1}{2} Pr(v<th)$ = Bit error rate for digital ones;
$BER(0) = \tfrac{1}{2} Pr(v>th)$ = Bit error rate for digital zeros;
v = voltage level of the data signal; and
th = comparator threshold level for a single time decision circuit The definition of BER(0) may be updated from equation (1) because an error in reading a logical zero will occur whenever any error in any of the decision circuits occurs. The new BER(0) definition for three decision circuits 206-1, 206-2, and 206-3 is given as:

$$BER(0) = \tfrac{1}{2} Pr(v>th1) + \tfrac{1}{2} Pr(v>th2) + \tfrac{1}{2} Pr(v>th3) \qquad (2)$$

where th1 = threshold level for the first comparator circuit
th2 = threshold level for the second comparator circuit
th3 = threshold level for the third comparator circuit Assuming that the zero rail pulse is flat in the range of multiple decisions, and th1 is associated with the smallest Q value, then $$BER(0) = (3)\tfrac{1}{2} Pr(v>th1) \qquad (3)$$

Therefore, the net BER becomes:

$$BER = \tfrac{1}{2} BER(1) + (3)\tfrac{1}{2} BER(0) = 2BER(0) = 2BER(1). \qquad (4)$$

The corresponding Q value may thus be slightly less than expected for a given data signal. For example, the embodiment described with respect to FIGS. 3 and 4 will have a net Q value of about 15.8 dB instead of about 16 dB. This still reflects an improvement of about 1.8 dB for compared to a single-time decision receiver. This is because the multiple-time decision circuit will correct more "wrong ones" than it will incorrect "correct zeroes" by following the exemplary steps for setting delay times and threshold levels for various decision circuits. That is, the first decision circuit 206-1 is optimized at a first delay time $t_1$ and first threshold level $th_1$ by keeping the other decision circuits off. Then a second decision circuit 206-2 and a third decision circuit 206-3 are optimized one by one for an overall improvement in the Q value and BER. Those skilled in the art will recognize that additional decision circuits could be similarly added depending on the particulars of the communication system and level/type of distortion as illustrated in the eye diagram.

In another embodiment, a receiver consistent with the invention may include an output decision circuit for applying a selected read strategy to the detector signals. In the embodiment illustrated in FIG. 5, for example, a look-up table 502 and controller 504 are provided in the output decision circuit 220a. In general, the controller 504 may determine an optimal read strategy for each received bit and store the read strategy in the look-up table via control signal 521. The read strategy stored in the look-up table may be queried by decision logic 508, which applies the read strategy to the detector signals to provide a binary output representative of the received bit stream. Those skilled in the art will recognize a controller 504 consistent with the present invention may be embodied in a variety of devices, such as a programmable logic device (PLD) or microprocessor system. Also, it will be recognized that a look-up table 502 may be embodied in variety of configurations, e.g. as a controller-resident memory, a separate memory device, etc.

Figure 5:
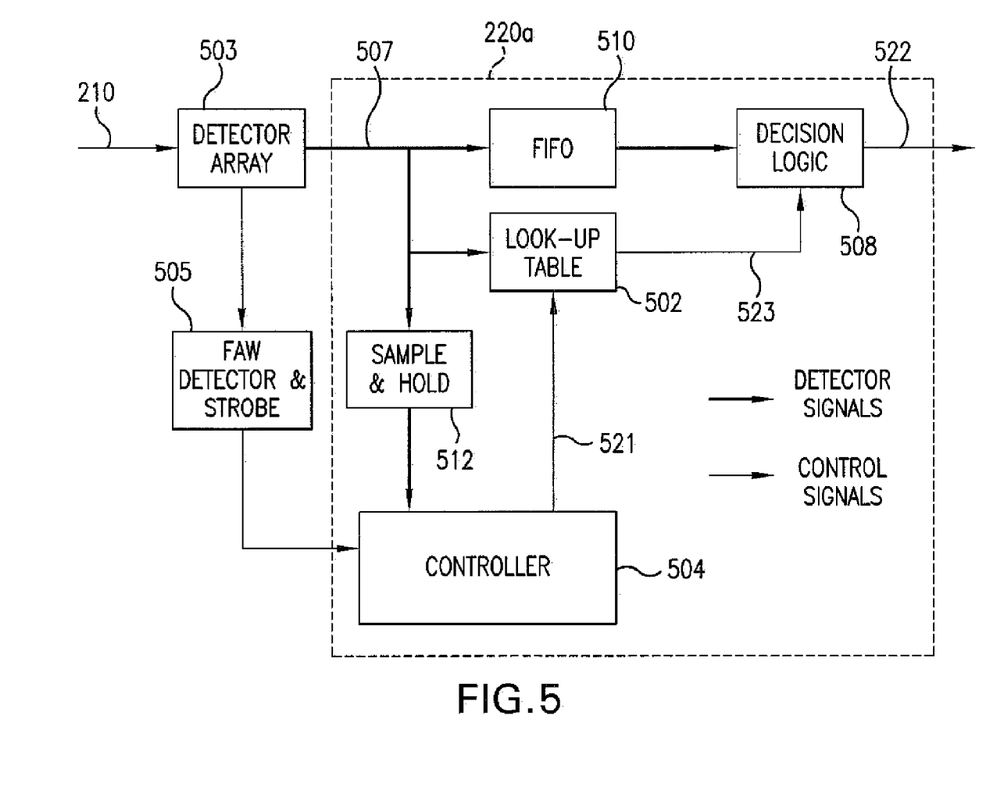
FIG. 5 is a block diagram of another exemplary embodiment of a multiple detector decision receiver consistent with the invention including an output decision circuit configured to apply a select logic function based on associated threshold decision circuit or detector outputs.

In the illustrated exemplary embodiment, an array of detectors 503 such as decision circuits 206-1, 206-2, 206-3, . . . 206-n may be provided to read a transmitted data signal received on line 210 at various voltage threshold and/or timing levels within each bit interval. The output of each decision circuit, i.e. detector signals 507, may be provided as the input to the output decision circuit 220a. The output decision circuit 220a may also include a first-in-first-out (FIFO) buffer 510 and a sample and hold register 512 that, along with the look-up table 502, accept the plurality of detector signals 507 from the plurality of detectors 503.

The optimal read strategy may be to simply select the output from one decision circuit or detector. Alternatively, the best strategy may be to provide a binary output in response to a logical combination of one or more of the detector signals 507. As such, an output decision circuit consistent with the invention may apply a selected logic function based on the outputs from each decision circuit or detector to provide an output 522 representative of a binary state of a received optical signal.

Figure 6:
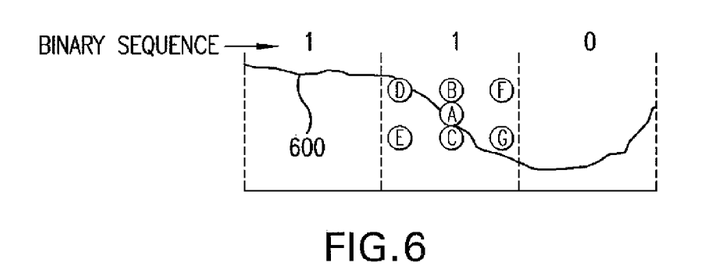
FIG. 6 is an exemplary plot of a received data signal suffering from degradation and an exemplary placement of seven detectors or decision circuits within a bit time period consistent with the invention.

For instance, FIG. 6 illustrates exemplary approximate voltage threshold and timing level placements that may be utilized in an exemplary embodiment of a receiver consistent with the present invention. The threshold and timing placements are identified as points A–G, respectively, for each of seven decision circuits, e.g. circuits 206-1, 206-2, 206-3, 206-4, 206-5, 206-6, 206-7. The number of decision circuits and the voltage threshold and timing levels of each may be chosen by studying different classes of transmission impairments. For instance, there may be three detectors set to different voltage threshold levels, but set to sample at the same time, as illustrated at points A, B, and C.

A portion of an exemplary received signal 600 representing an intended binary sequence of 1,1,0 is illustrated. As shown, the received signal 600 may suffer from degradation due to a variety of factors that cannot be completely eliminated. The center bit, defined by bit time periods illustrated as vertical dotted lines, should be read as a binary one. If only one decision circuit having a threshold level at point A was utilized, it would misread the center bit as a digital zero.

The output values from the seven exemplary decision circuits associated with thresholds at points A–G are illustrated in the Table 1.

TABLE 1

| Threshold Level | A | B | C | D | E | F | G |
|---|---|---|---|---|---|---|---|
| Read Value | 0 | 0 | 1 | 1 | 1 | 0 | 0 |

The correct reading of "1" for the center bit could be derived from a variety of decision circuits alone, e.g., the circuits having thresholds at points C, D, and E which all read a digital one, or a myriad of logical functions, e.g. OR, AND, XOR, etc., applied to the read value of a combination of decision circuits.

In order to decide which combination of decision circuit outputs offers the best-read strategy for a particular bit or bit sequence, a look-up table 502 may be constructed and derived from a learning process. To construct the look-up table 502, a sequential binary teaching sequence of bits may be added to a transmitted data frame. Successive data frame structures 708 including a teaching bit sequence 706 consistent with the invention are diagrammatically illustrated in FIG. 7. Those skilled in the art will recognize a transmitted data frame may include a frame alignment word 700 (FAW), e.g., a short sequence of unchanging bits, a number of utility bits 702 for inter-station communication, and a system of data and parity bits 704, as shown.

Figure 7:
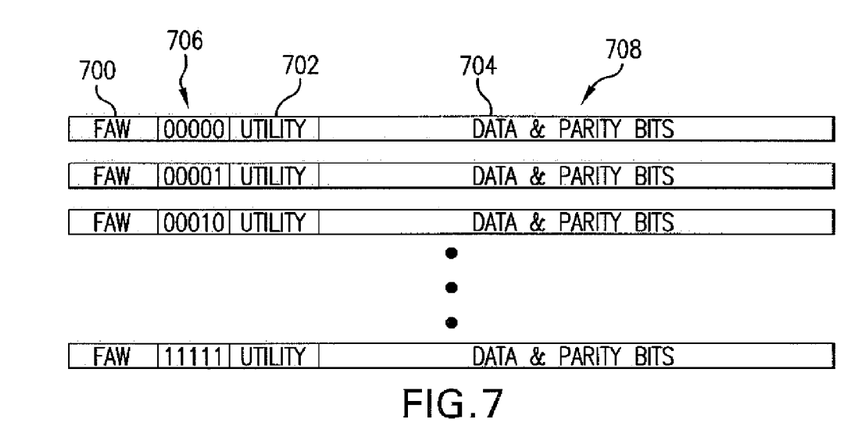
FIG. 7 is a flow chart illustrating operation of an exemplary controller in the embodiment illustrated in FIG. 5.

The training sequence of bits 706 added to the transmitted data frames may represent a simple ascending binary sequence, as illustrated in FIG. 7. Those skilled in the art will recognize, however, that any chosen sequence of training bits may be utilized as long as the receiver knows what to expect from each training bit sequence. The training bits allow the controller 504 to establish an association between a known bit or bit sequence and the way the plurality of decision circuits 206-1, 206-2, 206-3 . . . 206-n interprets that bit or bit sequence. From this information, the controller 504 may develop an optimal read strategy for such a bit or sequence of bits and store such information in the look-up table 502.

The controller 504 may communicate the read strategy to the look-up table 502 via the control signal 521. In turn, the look-up table may communicate with the decision logic circuit 508 via a look-up control signal 523. The decision logic circuit 508 may provide a selected logic function such as OR, AND, XOR, etc based on instructions from the look-up control signal 523. The logic state functionality may be provided in the decision circuit by a wide variety of configurations, e.g., by a programmed microprocessor, by cascaded logic gates, etc. The application of the selected logic function by the decision circuit 508 to the detector signals output from the FIFO 510 provides an output signal 522 that is representative of a binary state of the received optical signal.

Figure 8:
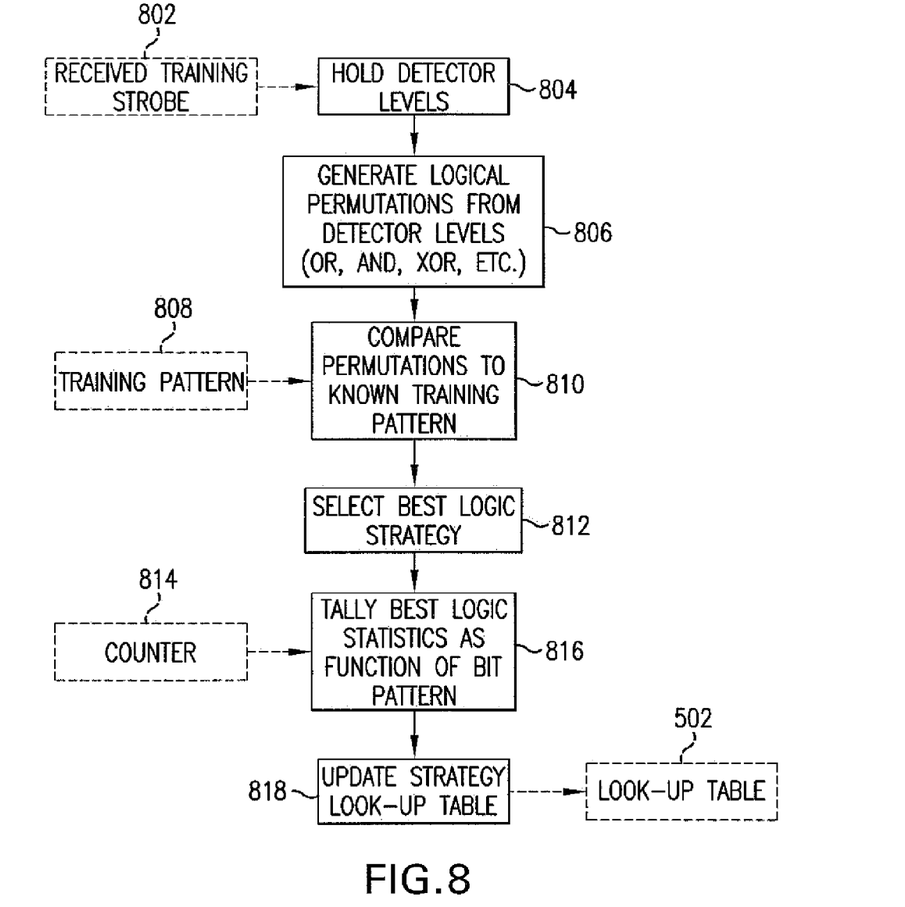
FIG. 8 is a simplified flow chart of the operations of an exemplary controller.

Turning to FIG. 8, there is provided a simplified flow chart of the operations of an exemplary controller 504. The controller may receive a training strobe 802 from an FAW detector and strobe 505 and from the sample and hold register 512. The controller may then generate logical permutations 706, e.g. OR, AND, XOR, etc based on these detector levels. The controller may then compare a known training sequence or pattern 708 with the logic permutations to select the best logic strategy for each bit or sequence of bits 712. The best logic statistics as a function of bit pattern may then be tallied 716 and used to update the best logic strategy 718 for the look-up table 502. As such, the best logic strategy choices may then be periodically loaded, according to counter 714, into the look-up table 502 for real time use by the decision logic 508.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An optical signal receiver for receiving an optical signal comprising:

a plurality of threshold decision circuits configured to receive an electrical signal representative of said optical signal, each of said threshold decision circuits being configured to sample said electrical signal and to provide an associated threshold decision circuit output in response to a comparison of said signal to an associated threshold level; and an output decision circuit configured to receive each of said threshold decision circuit outputs and output a signal representative of a binary state of said optical signal, wherein said output decision circuit is further configured to apply a selected logic function to said threshold decision circuit outputs for providing said signal representative of said binary state of said optical signal, and wherein said output decision circuit comprises a controller and a look-up table, said controller configured to receive said threshold decision circuit outputs and provide an associated control signal representative of said selected logic function to said look-up table for storing data representative of said selected logic function in said look-up table.

2. An optical receiver of claim 1, wherein said output decision circuit is further configured to output a digital one if at least one of said threshold decision circuit outputs is a digital one.

3. A receiver according to claim 1, wherein said output decision circuit comprises an OR gate, and wherein each of said threshold decision circuit outputs is coupled to an associated input of said OR gate.

4. A receiver according to claim 1, said receiver comprising first, second, and third ones of said threshold decision circuits.

5. A receiver according to claim 1, wherein each said threshold decision circuit comprises an associated comparator circuit for performing said comparison of said signal with said associated threshold level.

6. A receiver according to claim 1, wherein said output decision circuit is further configured to apply a selected logic function to said threshold decision circuit outputs for providing said signal representative of said binary state of said optical signal.

7. A receiver according to claim 6, wherein said selected logic function comprises selecting one of said associated threshold decision circuit outputs.

8. A receiver according to claim 6, wherein said selected logic function is selected from the group consisting of: OR, AND, and XOR.

9. A receiver according to claim 1, wherein said output decision circuit further comprises decision logic for receiving said threshold decision circuit outputs, said decision logic being configured to apply said selected logic function to said outputs in response to said data representative of said selected logic function.

10. An optical signal receiver for receiving an optical signal comprising:
a plurality of threshold decision circuits configured to receive an electrical signal representative of said optical signal, each of said threshold decision circuits being configured to sample said electrical signal and to provide an associated threshold decision circuit output in response to a comparison of said signal to an associated threshold level; and
an output decision circuit configured to receive each of said threshold decision circuit outputs and output a signal representative of a binary state of said optical signal, wherein said output decision circuit is further configured to apply a selected logic function to said threshold decision circuit outputs for providing said signal representative of said binary state of said optical signal, and wherein said optical signal comprises a predetermined teaching bit sequence, and wherein a look-up table is constructed by adding said teaching bit sequence with a transmitted data frame.

11. An optical communication system comprising:
a transmitter providing an optical signal on an optical information channel; and
a receiver coupled to said optical information channel for receiving said optical signal, said receiver comprising a plurality of threshold decision circuits configured to receive an electrical signal representative of said optical signal, each of said threshold decision circuits being configured to sample said electrical signal at a sample time within a bit time period and to provide an associated threshold decision circuit digital output in response to a comparison of said sample of said signal to an associated threshold level, wherein each of said threshold decision circuits comprises an associated delay element for establishing said sample time associated therewith, and wherein at least some of said threshold decision circuits are configured to sample said electrical signal at different sample times within said bit time period; and
an output decision circuit configured to receive each of said threshold decision circuit digital outputs and output a signal representative of a binary state of said optical signal within said bit time period and wherein said output decision circuit comprises a controller and a look-up table, said controller configured to receive said threshold decision circuit digital outputs and provide an associated control signal representative of said selected logic function to said look-up table for storing data representative of said selected logic function in said look-up table.

12. A system according to claim 11, wherein said output decision circuit is further configured to output a digital one if at least one of said threshold decision circuit digital outputs is a digital one.

13. A system according to claim 11, wherein said output decision circuit comprises an OR gate, and wherein each of said threshold decision circuit digital outputs is coupled to an associated input of said OR gate.

14. A system according to claim 11, wherein said receiver comprises first, second, and third ones of said threshold decision circuits.

15. A system according to claim 11, wherein each said threshold decision circuit comprises an associated comparator circuit for performing said comparison of said signal with said associated threshold level.

16. A system according to claim 11, wherein said output decision circuit is further configured to apply a selected logic function to said threshold decision circuit outputs for providing said signal representative of said binary state of said optical signal.

17. An optical communication system comprising:
a transmitter providing an optical signal on an optical information channel; and
a receiver coupled to said optical information channel for receiving said optical signal, said receiver comprising a plurality of threshold decision circuits configured to receive an electrical signal representative of said optical signal, each of said threshold decision circuits being configured to sample said electrical signal and to provide an associated threshold decision circuit output in response to a comparison of said signal to an associated threshold level; and
an output decision circuit configured to receive each of said threshold decision circuit outputs and output a signal representative of a binary state of said optical signal, wherein said output decision circuit is further configured to apply a selected logic function to said threshold decision circuit outputs for providing said signal representative of said binary state of said optical signal, and wherein said output decision circuit comprises a controller and a look-up table, said controller configured to receive said threshold decision circuit outputs and provide an associated control signal representative of said selected logic function to said look-up table for storing data representative of said selected logic function in said look-up table.

18. A system according to claim 17, wherein said output decision circuit further comprises decision logic for receiving said threshold decision circuit outputs, said decision logic being configured to apply said selected logic function to said outputs in response to said data representative of said selected logic function.

19. A system according to claim 17, wherein said selected logic function comprises selecting one of said associated threshold decision circuit outputs.

20. A system according to claim 17, wherein said selected logic function is selected from the group consisting of: OR, AND, and XOR.

21. An optical communication system comprising:
a transmitter providing an optical signal on an optical information channel; and
a receiver coupled to said optical information channel for receiving said optical signal, said receiver comprising a plurality of threshold decision circuits configured to receive an electrical signal representative of said optical signal, each of said threshold decision circuits being configured to sample said electrical signal and to provide an associated threshold decision circuit output in response to a comparison of said signal to an associated threshold level; and
an output decision circuit configured to receive each of said threshold decision circuit outputs and output a signal representative of a binary state of said optical signal, wherein said output decision circuit is further configured to apply a selected logic function to said threshold decision circuit outputs for providing said signal representative of said binary state of said optical signal,
and wherein said output decision circuit comprises a controller and a look-up table, said controller configured to receive said threshold decision circuit outputs and provide an associated control signal representative of said selected logic function to said look-up table for storing data representative of said selected logic function in said look-up table.

22. The optical communication system according to claim 21, wherein
said output decision circuit is configured to receive each of said threshold decision circuit outputs and output a digital one if at least one of said threshold decision circuit outputs is a digital one.

23. The optical communication system according to claim 21, wherein said output decision circuit comprises an OR gate, and wherein each of said threshold decision circuit outputs is coupled to an associated input of said OR gate.

24. The optical communication system according to claim 21, wherein said controller further comprises a first-in-first-out buffer.

25. The optical communication system according to claim 21, wherein each said threshold decision circuit comprises an associated delay element for establishing said sample time associated therewith.

26. The optical communication system according to claim 21, wherein each said threshold decision circuit comprises an associated comparator circuit for performing said comparison of said signal with said associated threshold level.

27. An optical signal receiver for receiving an optical signal comprising:
a plurality of threshold decision circuits configured to receive an electrical signal representative of said optical signal, each of said threshold decision circuits being configured to sample said electrical signal and to provide an associated threshold decision circuit output in response to a comparison of said signal to an associated threshold level; and
an output decision circuit configured to receive said associated threshold decision circuit outputs and apply a selected logic function to said threshold decision circuit outputs for providing an output signal representative of a binary state of said optical signal, said output decision circuit comprising a controller and a look-up table, said controller configured to receive said threshold decision circuit outputs and provide an associated control signal representative of said selected logic function to said look-up table for storing data representative of said selected logic function in said look-up table.

28. A receiver according to claim 27, wherein said output decision circuit further comprises decision logic for receiving said threshold decision circuit outputs, said decision logic being configured to apply said selected logic function to said outputs for providing said output signal representative of a binary state of said optical signal.

29. A receiver according to claim 27, wherein said selected logic function comprises selecting one of said associated threshold decision circuit outputs.

30. A receiver according to claim 27, wherein said selected logic function is selected from the group consisting of: OR, AND, and XOR.

31. A method of reconstructing a received data signal in an optical communication system, said method comprising:
sampling said data signal at a plurality of sample times within a bit time period;
providing a threshold decision digital output associated with each of said sample times in response to a comparison of said data signal with an associated threshold level; and
coupling each said threshold decision digital outputs to an output decision circuit having a controller and a look-up table, said controller configured to provide an associated control signal representative of a selected logic function to said look-up table for storing data representative of said selected logic function in said look-up table.

32. A method according to claim 31, wherein said output decision circuit is configured to apply a logic function to said threshold decision digital outputs for providing said output signal.

33. A method according to claim 32, wherein said logic function is an OR function.

34. A method according to claim 32 further comprising the step of
comparing individual bits of a predetermined teaching bit sequence with said threshold decision outputs for determining an optimal read strategy in response to said teaching bit sequence.

35. A method according to claim 32, wherein
a first one of said sample times is established by adjusting said first sample time until the error rate performance of said system is optimized.

36. A method according to claim 35, wherein
a second one of said plurality of sample times is established after said first sample time by adjusting a second sampling time until the error rate performance of said system is optimized.

37. A method according to claim 34, wherein a third one of said plurality of sample times is established after said first and second sample times by adjusting said third sample time until the error rate performance of said system is optimized.

* * * * *